Jan. 10, 1950 W. L. DUMAS 2,493,806
PORTABLE AUXILIARY SEAT FOR AUTOMOBILES
Filed Nov. 6, 1947
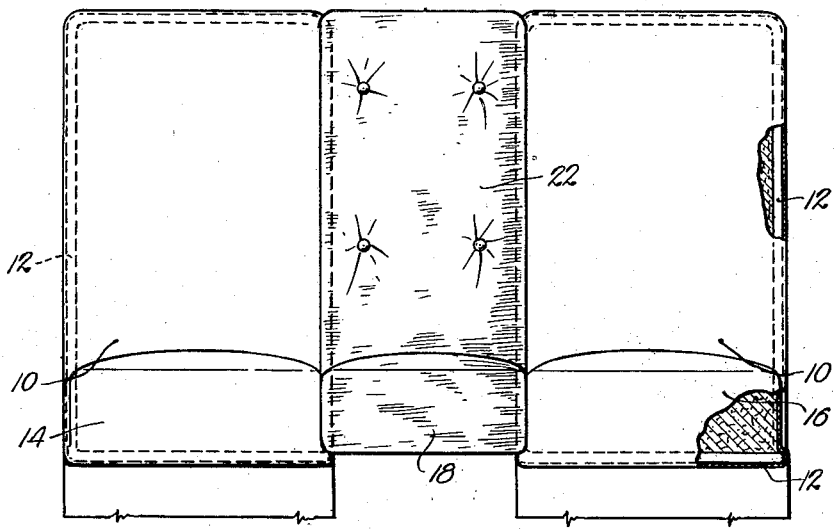
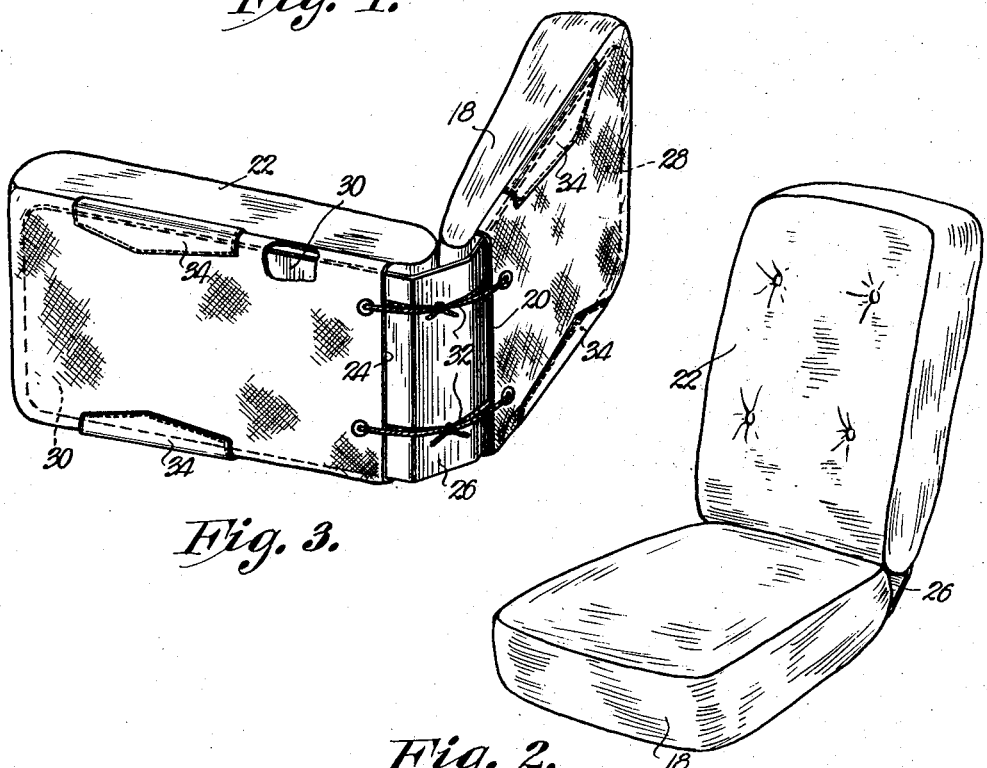
INVENTOR.
Walter L. Dumas Patented Jan. 10, 1950

2,493,806

UNITED STATES PATENT OFFICE 2,493,806

PORTABLE AUXILIARY SEAT FOR AUTOMOBILES

Walter L. Dumas, Miami, Okla.

Application November 6, 1947, Serial No. 784,393

8 Claims. (Cl. 155—33)

This invention relates to seats and particularly a structure comprising two spaced apart normally fixed chairs or cushioned seats of an automobile or the like, and the primary aim is to provide an auxiliary seat capable of filling the space between said cushioned seats to cooperate therewith in creating a continuous, relatively long, uninterrupted seating accommodation.

One of the primary aims of this invention is the provision of an auxiliary seat for spaced apart automobile seats, which auxiliary seat is provided with means for engaging the conventional framework of the automobile; means for holding a pair of associated cushions in assembled condition; and means for releasably interconnecting the cushions when the same are in the normal operative position with respect to the said holding means.

A yet further aim of this invention and a specific object thereof is the provision of an auxiliary seat for automobiles known as a "jeep," and wherein the front seats thereof are held in spaced relation and mounted upon frame work to provide a walkaway therebetween, which auxiliary seat is dimensioned and so proportioned as to fit snugly between the cushions of the front seat of the jeep automobile in a manner to cause the rigid backing of the auxiliary seat to firmly engage the framework for the purpose of removably mounting the auxiliary seat in place where it will support a person when seated thereon and further will form, with the normal seats of the automobile, a continuous relatively long seating device.

Further aims of this invention include the provision of a portable auxiliary seat comprising a pair of cushions mounted upon a specially formed backing member through the medium of pockets that receive the legs of the L-shaped backing member, the said cushions being held in place with their proximal ends in substantial abutment at the zone of juncture between the legs of the L-shaped backing member by releasable interconnecting elements such as tapes or the like.

Other aims of the invention will appear during the course of the following specification, referring to the accompanying drawing, wherein:

Fig. 1 is a front elevational view of an automobile seat having the portable auxiliary seat forming a part of this invention associated therewith.

Fig. 2 is a perspective view of my portable auxiliary seat for automobiles showing the same entirely removed from association with the automobile seats with which it is designed to function; and Fig. 3 is another perspective view of the seat illustrating the manner in which the relatively rigid L-shaped backing cooperates with the two cushions of the seat assembly and holding the latter in operative position.

The form of the invention chosen for illustration is fully capable of cooperating with a pair of spaced apart automobile seats 10, each of which is carried by framework 12 rigidly supported by the automobile and forming a component part thereof.

Seats 10 have cushions 14 and 16 respectively that are carried by frame 12 and these seats 10 are spaced apart to provide a walk-away therebetween. Such structure and arrangement of seating devices is particularly peculiar to the automobile known as a "jeep" and when this particular type of automotive equipment is used domestically, it is desirable that the said space between the two seats 10 be filled and made usable as a seat for a third occupant.

The auxiliary seat shown in Figs. 2 and 3 may be positioned in an operative manner without the use of special equipment and as shown in Fig. 1 when the same is made as illustrated in Figs. 2 and 3. The auxiliary seat per se, comprises a cushion 18 upon which the occupant sits when the auxiliary seat is in place as shown in Fig. 1. This cushion 18 has a pocket 20 formed therein, which pocket has its mouth or opening adjacent the normally rearmost end of cushion 18.

Another cushion 22 forming the back of the auxiliary seat has a like pocket 24 provided at the back thereof and this pocket likewise has its mouth or opening adjacent to the normally lowermost end of cushion 22.

A relatively rigid L-shaped backing member 26 has the legs 28 and 30 thereof within pockets 20 and 24 respectively when cushions 18 and 22 are in the operative position. Thus, the normally rear and normally lower ends of cushions 18 and 22 are in abutting relation at the zone of juncture between legs 28 and 30 of this said backing member 26. When the cushions are so disposed, as clearly shown in Fig. 3, the same are interconnected by tapes or the like 32 that may be quickly manipulated to hold or release cushions 18 and 22 according to the desires of the users. In other words, when it is desired to assemble the auxiliary seat, cushions 18 and 22 are placed upon the backing 26 and tapes 32 are then tied to establish a complete unitary assembly. If either of the cushions 18 and 22 is to be dismounted or removed from backing 26, tapes 32 are released and the cushion is free to slide from this said backing. The backing per se is formed of a sheet of material of any desired character so long as it is capable of supporting the two cushions 18 and 20 in the positions shown in Fig. 2. The backing 26 may be relatively light however, because the auxiliary seat is wedged between seats 10 of the automobile, as shown in Fig. 1, and when so positioned, the backing 26 bridges the space between these said seats 10 and backing 26 rests upon frames 12 when the cushions of seats 10 are flexed outwardly. Thus, upon application of the auxiliary seat, it is squeezed between the pair of spaced cushioned seats 10 and accidental dislodgement is unlikely to occur.

Friction pads 34 stitched or otherwise secured to the outer faces of cushions 18 and 22 rest directly upon that part of seats 10 that takes the load when the auxiliary seat is in the operative position. These pads 34 may be of fabric, leather or other suitable material but leather is desirable because of its ability to withstand wear and its character that allows stitching of the pads 34 directly in place upon the material from which cushions 18 and 22 are made.

As shown in Fig. 3, the pockets 20 and 24 are formed by placing a sheet of fabric over the sides of cushions 18 and 22 respectively and stitching said sheet of fabric around three sides to leave one end unattached to form the mouths of pockets 20 and 24.

This auxiliary seat is an important addition to the automobile above defined because it provides a relatively wide front seat more comfortably occupied by two riders and in the event three persons desire to occupy the front seat of the automobile, this auxiliary seating unit, when mounted between seats 10, will afford the required accommodations.

The manner of forming cushions 18 and 20 need not be described for the structure may vary to suit conditions and terms employed. These cushions are stuffed or provided with springs as the manufacturer may desire and backing 26 is bent to form an initially L-shaped member prior to the placement of cushions 18 and 22 thereon. When shipping or otherwise handling or storing the auxiliary seat, backings 26 may be nested and cushions 18 and 22 stacked and packed in a compact condition.

There is a definite relation between the size of the auxiliary seat above defined and the space between seats 10 of the automobile and the width of both backing 26 and cushions 18 and 20 should be determined with accuracy prior to the formation of the auxiliary seat. Inwardly compressing the cushions of seats 10 to a point where the marginal edges of the legs of backing 26 may rest upon a rigid portion of seats 10 is all that is necessary and the placement of pads 34 at any zone along the lengths of the backs of cushions 18 and 22 at the longitudinal edges thereof will insure avoidance of objectionable wear.

The preferred embodiment of my invention has been above described and disclosed in the accompanying drawing, but since the broad concepts are capable of inclusion in devices different from the one shown and described, it is desired to be limited only by the scope of the appended claims.

Having thus described my invention, what is claimed as new and desired to be secured by Letters Patent is:

1. In combination with a pair of spaced apart, cushioned seats having framework supporting the cushions thereof, an auxiliary seat dimensioned to fill the space between said cushioned seats comprising a pair of cushions; and a relatively rigid backing for the said cushions, said backing and the cushions having a width great enough to bridge the distance between the said framework for support thereby and to compress the cushions on the framework to establish a tight fit for the said auxiliary seat when squeezed between the pair of spaced, cushioned seats.

2. In combination with a pair of spaced apart, cushioned seats having framework supporting the cushions thereof, an auxiliary seat dimensioned to fill the space between said cushioned seats comprising a pair of cushions; a relatively rigid backing for the said cushions, said backing and the cushions having a width great enough to bridge the distance between the said framework for support thereby and to compress the cushions on the framework to establish a tight fit for the said auxiliary seat when squeezed between the pair of spaced, cushioned seats; and friction pads on the auxiliary seat engageable directly with the framework when the said seat is in place between the pair of cushioned seats and upon the said framework.

3. In combination with a pair of spaced apart, cushioned seats having framework supporting the cushions thereof, an auxiliary seat dimensioned to fill the space between said cushioned seats comprising a pair of cushions; a relatively rigid backing for the said cushions, said backing and the cushions having a width great enough to bridge the distance between the said framework for support thereby and to compress the cushions on the framework to establish a tight fit for the said auxiliary seat when squeezed between the pair of spaced, cushioned seats; and pockets formed in the cushions of the auxiliary seat to receive the said backing.

4. In combination with a pair of spaced apart, cushioned seats having framework supporting the cushions thereof, an auxiliary seat dimensioned to fill the space between said cushioned seats comprising a pair of cushions, a relatively rigid backing for the said cushions, said backing and the cushions having a width great enough to bridge the distance between the said framework for support thereby and to compress the cushions on the framework to establish a tight fit for the said auxiliary seat when squeezed between the pair of spaced, cushioned seats; and pockets formed in the cushions of the auxiliary seat to receive the said backing, said backing being in the nature of a sheet of material, L-shaped in form and having the legs thereof extending into a pocket of a cushion respectively of the said auxiliary seat.

5. In combination with a pair of spaced apart, cushioned seats having framework supporting the cushions thereof, an auxiliary seat dimensioned to fill the space between said cushioned seats comprising a pair of cushions; a relatively rigid backing for the said cushions, said backing and the cushions having a width great enough to bridge the distance between the said framework for support thereby and to compress the cushions on the framework to establish a tight fit for the said auxiliary seat when squeezed between the pair of spaced, cushioned seats; and pockets formed in the cushions of the auxiliary seat to receive the said backing, said backing being in the nature of a sheet of material, L-shaped in form and having the legs thereof extending into a pocket of a cushion respectively of the said auxiliary seat, said cushions having interconnecting elements of easily releasable character joining the same at the zone of juncture between the legs of the L-shaped backing.

6. An auxiliary seat of the character described comprising a pair of cushions each having a pocket formed therein; an L-shaped backing having the legs thereof projecting respectively into a pocket of a cushion to hold the same in place for use; and releasable means interconnecting the cushions to hold the same in place on the backing.

7. An auxiliary seat of the character described comprising a pair of cushions each having a pocket formed therein; an L-shaped backing having the legs thereof projecting respectively into a pocket of a cushion to hold the same in place for use; and releasable means interconnecting the cushions to hold the same in place on the backing, said cushions having friction pads on the outer sides thereof.

8. An auxiliary seat of the character described comprising a flat sheet of material formed to present an L-shaped body; a cushion, having a pocket formed therein, mounted on each leg of the body, with the leg in the pocket; and quickly releasable means interconnecting the cushions to hold the cushions in place on the L-shaped body.

WALTER L. DUMAS.

REFERENCES CITED

The following references are of record in the file of this patent:

UNITED STATES PATENTS

| Number | Name | Date |
| --- | --- | --- |
| 633,012 | Kidd et al. | Sept. 12, 1899 |
| 883,929 | Baxter | Apr. 7, 1908 |
| 1,422,915 | Benson et al. | July 18, 1922 |
| 1,855,488 | Rich | Apr. 26, 1932 |
| 1,882,485 | Clements | Oct. 11, 1932 |
| 2,041,919 | Gaston | May 26, 1936 |

FOREIGN PATENTS

| Number | Country | Date |
| --- | --- | --- |
| 13,403 | Australia | May 21, 1928 |